US006690670B1

(12) United States Patent
Castellano (10) Patent No.: US 6,690,670 B1
(45) Date of Patent: Feb. 10, 2004

(54) SYSTEM AND METHOD FOR TRANSMISSION BETWEEN ATM LAYER DEVICES AND PHY LAYER DEVICES OVER A SERIAL BUS

(75) Inventor: Robert Castellano, Monmouth, NJ (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/267,048

(22) Filed: Mar. 12, 1999

Related U.S. Application Data (60) Provisional application No. 60/077,968, filed on Mar. 13, 1998.

(51) Int. Cl.[7] .............................. H04L 12/56; H04J 3/22
(52) U.S. Cl. ................................ 370/395.1; 370/395.2; 370/395.6; 370/469
(58) Field of Search ........................... 370/395.1, 395.2, 370/395.3, 395.6, 395.61, 395.62, 465, 466, 467, 469, 474, 489

(56) References Cited

U.S. PATENT DOCUMENTS

| | | | | |
|---|---|---|---|---|
| 5,418,786 A | * | 5/1995 | Loyer et al. ............. | 370/395.4 |
| 5,485,456 A | * | 1/1996 | Shtayer et al. ........... | 370/395.1 |
| 5,784,370 A | * | 7/1998 | Rich ........................ | 370/395.1 |
| 5,974,047 A | * | 10/1999 | Kim ....................... | 370/395.41 |
| 6,147,997 A | * | 11/2000 | Holden et al. .............. | 370/359 |

OTHER PUBLICATIONS

"Serializing High Speed Parallel Buses to Extend Their Operational Length," Cypress Semiconductor Corp., Jul. 27, 1995, pp. 1–25.

* cited by examiner

Primary Examiner—Hassan Kizou
Assistant Examiner—Saba Tsegaye
(74) Attorney, Agent, or Firm—Thomas, Kayden, Horstemeyer & Risley, LLP (57) ABSTRACT

A system and method for transmission over a bus between ATM layer devices and PHY layer devices which exist on different printed circuit boards use a ATM-PHY layer interface connected to the ATM and PHY layers across a bus. Data and control signals are transmitted across the ATM-PHY interface consisting of a single clock and one or more pairs of data leads. Asynchronous cell transmission without flow control, with cell level flow control and with byte/octet level flow control as well as cell synchronization are possible. The number of signals required to connect the PHY/ATM layer devices are dramatically reduced by transporting the data and control information using in-band signaling.

19 Claims, 7 Drawing Sheets

SYSTEM AND METHOD FOR TRANSMISSION BETWEEN ATM LAYER DEVICES AND PHY LAYER DEVICES OVER A SERIAL BUS

CROSS-REFERENCE TO RELATED APPLICATION

This application claims priority to and the benefit of the filing date of co-pending and commonly assigned Provisional Application Serial No. 60/077,968, entitled METHOD FOR TRANSMISSION OF ATM UTOPIA INTERFACE OVER A SERIAL BUS, filed Mar. 13, 1998, and hereby incorporated by reference.

TECHNICAL FIELD

The present invention relates generally to the field of communications and computing systems and methods for transmitting and exchanging electronic data between two points, and more specifically, to the field of asynchronous transfer mode in data communications for transporting information across a serial bus.

BACKGROUND OF THE INVENTION

Asynchronous Transfer Mode (ATM) is a protocol-independent, cell-switching network technology that offers high speed and low latency for the support of data, voice, and video and frame relay traffic in real time. ATM provides for the automatic and guaranteed assignment of bandwidth to meet the specific needs of applications, making it ideally suited to support multimedia. ATM also lends itself to upward and downward scaling, making it equally suited for interconnecting local area networks and building wide area networks. ATM based networks may be accessed through a variety of standard interfaces, including frame relay. Although this technology has traditionally been used in local area networks involving workstations and personal computers, it has now been adopted by telephone companies.

ATM is defined in the broadband ISDN protocol at the levels corresponding to levels 1 and 2 of the ISO/OSI model, which are the physical layer and data-link layer. In computer networks, the physical layer is responsible for handling both the mechanical and electrical details of the physical transmission of a bit stream. At the physical layer, the communicating systems agree on the electrical representation of a binary 0 and 1, so that when data are sent as a stream of electrical signals, the receiver is able to interpret the data properly as binary data. This layer is implemented in the hardware of the networking device. The data-link layer is responsible for handling the frames, or fixed-length parts of packets, including any error detection and recovery that occurs in the physical layer.

Voice, video, and data traffic usually are comprised of bytes, packets, or frames. When the traffic reaches an ATM switch, it is segmented into small, fixed-length units called cells. The size of ATM cells is fixed at 53 octets; the cell consists of a 5-octet header and 48-octet payload. The cell header contains the information needed to route the information field through the ATM network.

ATM uses a layered protocol model. ATM has only three layers: the Physical (PHY) layer, the ATM layer and the ATM Adaptation (AAL) layer. The ATM Physical layer currently defines several transport systems, including the Synchronous Optical Network (SONET), T3, optical fiber and twisted pair. There are also ATM physical layer definitions for T1, E1, ADSL, as well as fractional-T1 (i.e., N×64 Kbps) interfaces. SONET provides the primary transmission infrastructure for implementing public ATM networks, offering service at OC-1 (51.84 Mbps) to OC-12 (622.08 Mbps). Current definitions of SONET go up to OC 192 (9.952 GBps). SONET facilities have only limited availability to many users, however. Therefore, the user-to-network interface (UNI) outlines the use of DS3 and a PHY layer definition similar to Fiber Distributed Data Interface (FDDI) to provide a 100 Mbps private ATM network interface. The ATM layer provides segmentation and reassembly operations for data services that may use protocol data units (PDUs) different from those of an ATM cell. This layer then is responsible for relaying and routing, as well as multiplexing, the traffic through an ATM network. The AAL resides between the ATM layer and the higher layer protocols and provides the necessary services that are not part of the ATM layer, in order to support the higher-layer protocols.

ATM networks consist of ATM switching systems interconnected by ATM transmission facilities. An ATM switching system is a network element consisting of several physical interfaces, which are tied together via a high speed ATM switching fabric. ATM switching systems perform the function of receiving ATM cell streams on its interfaces, and independently routing each cell to a pre-defined output interface based on its input port, ATM cell header, and associated connection. Cells are routed through the ATM switching system (and network) along a fixed path through the network based on a specified connection and the connection policy attributes. Policy attributes establish certain criteria for the connection which become significant during periods of congestion. ATM switching systems employ buffering and scheduling techniques to minimize traffic loss and ensure connections are properly serviced based on policy attributes during periods of congestion.

Since traffic through an ATM network is asynchronous, it is very possible that cells arriving from a number of different physical interfaces at the same time are all directed to the same physical egress port. The event of scheduling cells from one or more input ports whose combined input rates exceeds the intended link's output rate, results in link congestion. ATM switching systems employ buffering to absorb traffic bursts.

A typical ATM switching system architecture has multiple physical interfaces interconnected via a high speed switching fabric. A typical switch can range in capacity from (16–160) 155 Mbps interfaces and in traffic capacity of 2.5 Gbps to 25+Gbps. ATM layer devices are typically designed to operate at either 155 Mbps or 622 Mbps. The ATM UTOPIA interface partitions the ATM switching system into a PHY layer and ATM layer. The ATM layer is typically associated with the high speed ATM switching fabric. The PHY layer is associated with the physical interface. The PHY layer typically transfers asynchronous cell streams from the ATM layer and adapts them onto the physical transmission medium. The ATM layer and its interface to the switching fabric typically operates at much higher transfer rates than the PHY layer. With the PHY layer having minimal buffering (2–4 cells), and the significant rate mismatch between the PHY and ATM layers, requires an asynchronous transfer control handshake between the ATM/PHY layers of the switch. Consequently the ATM layer typically performs the required cell buffering, traffic scheduling, and congestion control.

The UTOPIA protocol defines a standard interface between the ATM and PHY layers of an ATM switching system. This interface standard allows ATM switch fabrics supplied by 1 device manufacturer to interoperate with PHY devices from another manufacturer. This provides multiple technology supplier alternatives to ATM switch manufacturers. Aside from the UTOPIA standard, there are really no other "standard" interfaces between components in an ATM switching system. For the majority of ATM switching systems, the switch fabric portion of the design is a highly proprietary multi-device switching architecture from a single device supplier.

Since ATM switching fabrics are architected and structured to provide the interconnection of a large number of high bandwidth links, the ATM layer devices are typically designed to support 155 Mbps and now more commonly 622 Mbps interfaces and data rates. The ATM layer devices are fairly costly due to their bandwidth performance, traffic processing complexity, and ability to support large amounts of high-speed cell buffers. They typically have UTOPIA interfaces operating at 25 Mhz or 50 Mhz. What's worse, the 50 Mhz MPHY UTOPIA timing specifications have little to no timing margin, limiting the UTOPIA bus to operation on a single PCB (printed circuit board) or circuit pack within the system. This requires the ATM layer device and its associated PHY's to reside on the same board. This physical restriction really limits the ATM layer's ability to be shared across the maximum number of PHY devices in a system.

For example, a 622 Mbps ATM layer device can support over 300 2.048 Mbps E1 PHY interfaces. The real-estate requirements for 300 E1 interfaces is likely to be a factor of 10 higher than would practically fit on a single PCB in a system. In fact, a single 622 Mbps ATM-layer device would likely support an entire system, where the physical interfaces are distributed across many PCB's in the system.

Typically, ATM PHY-layer devices with ATM ATM-layer devices reside on the same printed circuit board, and are interconnected by a 16/32 data bus and several control signals to exchange ATM cells across the interface. When PHY/ATM layer devices are on the same printed circuit board (PCB) there is no overhead in connecting these devices using the standard UTOPIA interface. However, if the PHY/ATM layer devices reside on different PCBs, the number of signals required to interconnect the PHY/ATM layer devices the standard UTOPIA interface may be impractical, limit the scale of the system, bear a heavy cost burden, or may not even be possible due to timing requirements. Abstracting the UTOPIA interface over an adjoining bus using intermediate circuits enables the timing requirements to be satisfied. In addition, by reducing the number of signals required to extend the UTOPIA interface between multiple PCBs reduces the cost, complexity, and allows a greater number of these interfaces to be extended in the system.

The number of signals required to extend the UTOPIA interface across PCBs can be dramatically reduced by transporting the data and control information serially. This is of particular significance when a large number of PHY interfaces connect to a single ATM layer interface across multiple PCBs in a product or system. While there exists implementations for transmitting ATM cells across various non-UTOPIA bus interfaces, current implementations (prior art) are methods for interconnecting the multiple components comprising the ATM switch fabric section of the ATM switching system. The distinctive characteristic of prior art is that these devices are intended to perform the cell buffering, cell header translation, cell processing, cell scheduling, routing and cell discard functions within a larger switching system. Each instance of the device is connected to the rest of the fabric via interfaces unique to that manufacturer's chipset. The interconnection is typically over high bandwidth interfaces typically 155 Mbps/622 Mbps or greater. And finally, the PHY interfaces reside on the same PCB or module as their associated ATM-layer slice of the switch fabric. In various implementations where ATM data is exchanged over backplane buses, control signals are transported "out-of-band." Out-of-band control signaling requires extra electronics to handle the signaling band and may not be practical or cost effective.

There is, therefore, a need in the industry for a system and method addressing these and other related and unrelated problems.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The system of the present invention extends the basic architecture of the ATM switching system by providing a method for exchange of UTOPIA data and control information between the ATM and PHY layers of a switching system across a secondary transmission bus. The seconday transmission bus allows the ATM and PHY layers to be located on different PCBs in an ATM switching system which due to proximity or other restrictions makes it impractical to directly connect these entities using the UTOPIA interface. The secondary transmission bus requires a device on both sides of the interface to provide proper handshaking and meet timing requirements with the respective ATM layer and PHY layer devices. There would typically be one interface device located on the same PCB with the ATM layer and one interface device with the PHY layer. The interface devices are capable of transporting data between ATM layer and PHY layer devices. The interface devices also relay principal interface control signals and status indications, in a manner consistent with ATM layer and PHY layer control requirements. Primarily, this involves controlling the asynchronous transmission of cells across the data interface, which includes indicating when data being transmitted across the bus are valid or invalid (i.e., Idle), and where cells begin or end. It also involves the PHY layer's ability to indicate when it is able to accept cells from the ATM layer, and indicate when it has received cells which are ready to be transferred to the ATM layer (i.e., flow control). In a Multi-PHY configuration, the bus also provides a means for the above transfer control signaling for each associated PHY of the Multi-PHY.

The flow control mechanisms set forth in this invention minimize the amount of buffering required in the PHY layer device, as well as the ATM layer serial, and PHY layer serial interface devices (1–4 cells per device). Not only does it minimize the buffer requirements of these blocks, but it places the buffering and traffic management complexity in the ATM layer where it is typically found. Without employing these flow control techniques, the interface devices, and/or PHY device would become much more complex. If neither flow control, nor increased complexity in these devices is employed, the system will experience significant traffic loss during periods of congestion.

While there are many different bus designs which address the above invention, the intent of this disclosure is to detail a particular preferred bus implementation and identify specific techniques and methods enabling the preferred bus implementation to support the invention.

A system where a large number of PHY devices share the ATM layer device typically involves the interconnection of many PCBs using high speed backplane (system) buses. While system buses interconnecting the various PHY layer PCBs with the ATM layer PCBs can either be shared buses or point-point (serial) buses, point-point serial buses are illustrated in this invention. Methods and topologies defined for the point-point serial case, can also be shown to apply to the shared bus case. The reference to serial bus, also includes (n bit) wide point-point data buses.

Using the method and protocol of the present invention, the UTOPIA bus can be extended over a serial bus, reducing the PCB-PCB interface to as few as two data signals, and a clock. This minimizes the number of signals required to interconnect the ATM layer and multiple PHY layers in the system. Optimally, in-band signaling uses not only the same physical path as the data it serves, it also uses the same operating frequency as the data signals that are carried. The UTOPIA bus width can be increased by (n*2) data signals depending on the required bus bandwidth. Depending on the level of complexity required over the UTOPIA bus, protocols of varying complexity may be employed to provide the serialization and control of traffic.

According to the preferred embodiment, asynchronous cell transmission is accomplished without flow control, where minimal control information is required between the ATM-PHY layer interface.

According to another preferred embodiment, asynchronous cell transmission is accomplished with cell level flow control to compensate for data congestion at the receiver. Cell level flow control enables a receiver to signal to its remote transmitter to stop sending cells until the receiver is ready to accept them again. In cell level flow control, cell transfer is suspended following transmission of the last octet of the cell.

According to yet another preferred embodiment, asynchronous cell transmission is accomplished with octet level flow control. Octet level flow control introduces the added complexity that either the PHY or ATM layer interface have the ability to send a control signal indication to the other end at any time. In octet level flow control, cell transfer may be suspended prior to transmission of the last octet of the cell. Data can be suspended/resumed at any time.

It is therefore the object of the present invention to provide a protocol for transmitting signaling information across a serial bus both in-band and out-of-band. In-band signaling consists of encoding transfer control signals and indicators in the data bit stream. Out-of-band signaling is where transfer control signals and indicators are communicated on signals other than those carrying the data bit stream.

Another object of the present invention is to provide a protocol for transmitting signaling information "in-band" across a serial bus, thereby reducing the UTOPIA bus to as few as two data signals and a clock signal.

Another object of the present invention is to provide a cost-effective, scalable means for sharing a large number of PHY interfaces across an ATM layer interface. The ability to share large number of PHY interfaces across an ATM layer interface is typically required in broadband access multiplexers, concentrators, or ATM network access devices, such as DSLAMs. An ATM layer device operating at 622 Mbps, can theoretically support over 300 2.048 Mbps PHY interfaces.

Other objects, features, and advantages of the present invention will become apparent upon reading and understanding the present invention, when taken in conjunction with accompanying drawings.

BRIEF DESCRIPTION OF THE SEVERAL VIEWS OF THE DRAWINGS

The accompanying drawings, incorporated in and forming a part of the specification, illustrate several aspects of the present invention, and together with the description serve to explain the principles of the invention. In the drawings.

DETAILED DESCRIPTION OF THE INVENTION

Figure 1:
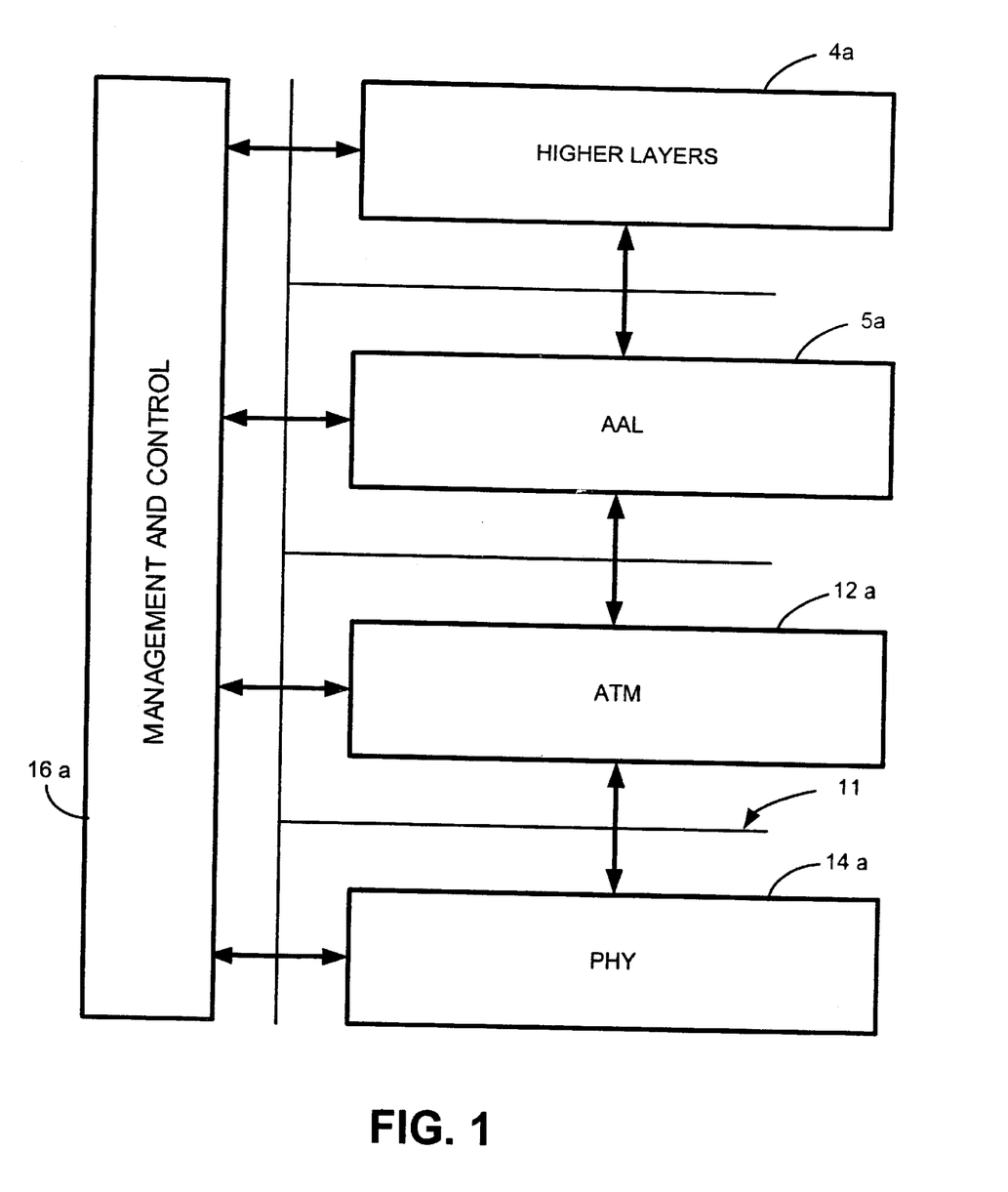
FIG. 1 is a basic reference model showing the scope of the present invention.

Turning now to the drawings, wherein like reference numerals designate corresponding parts throughout these several figures, FIG. 1 is a schematic view of the International Standards Organization (ISO) network model generally showing the different layers of a network and interfaces between those layers in a network. Shown are the PHY layer 14a, the ATM layer 12a, the AAL layer 5a and the higher layers 4a. The Universal Test & Operations PHY Interface for ATM (UTOPIA) interface 11 of the present invention defines the data path interface between the PHY layer 14a and upper layer modules such as the ATM layer 12a, and various management and control entities 16a. The definition allows a common PHY interface in ATM subsystems across a wide range of speeds and media types. Management and control entities 16a also communicate with the various layers of the network and configures, manages, and monitors devices at the respective layers. It should be understood that while the ATM layer 12a is shown communicating to a single PHY layer 14a, applications typically involve a single ATM layer 12a communicating with multiple PHY layers 14a. Further, multiple ATM layers 12a may communicate with multiple PHY layers 14a. In the interests of simplicity, only communications between a single ATM layer and a single PHY layer is discussed.

Figure 2:
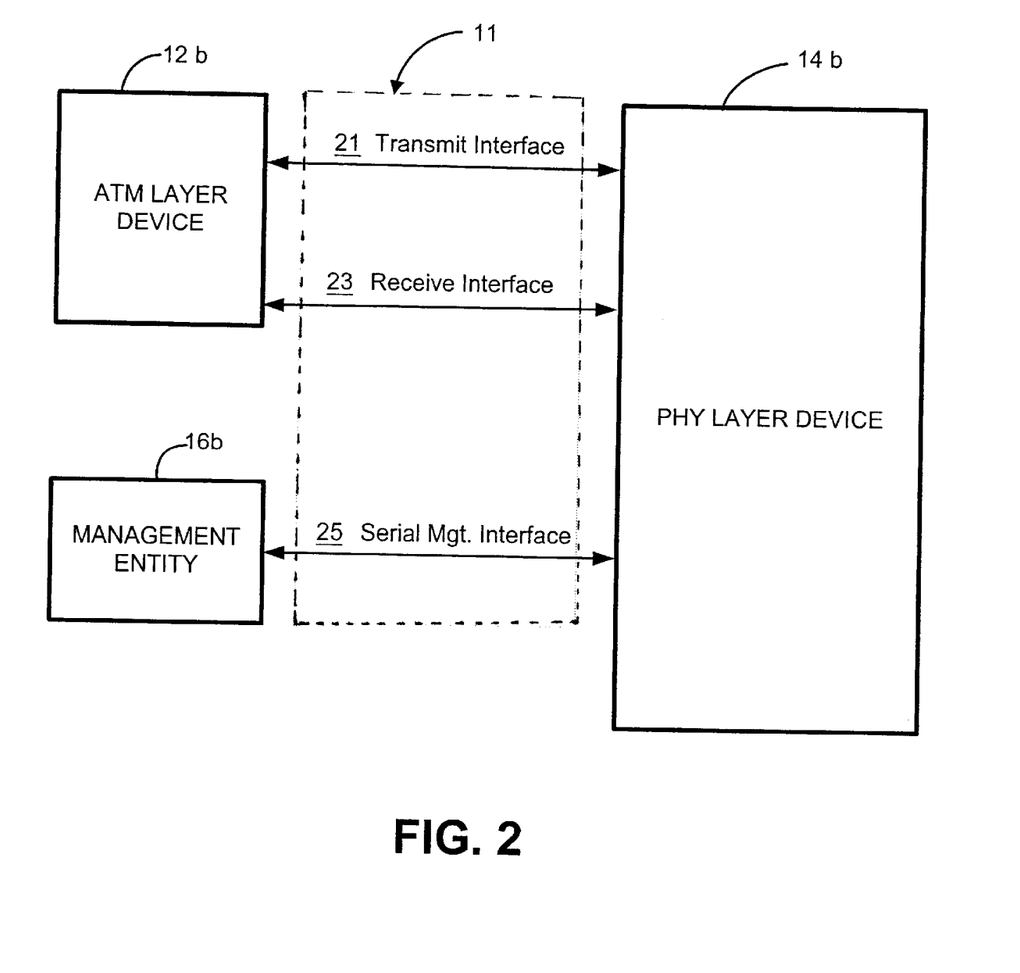
FIG. 2 is a high level diagram of the of the present invention connecting the ATM layer device of the ATM layer of FIG. 1 to a PHY layer device of the PHY layer of FIG. 1 which is also connected to a management entity.

Turning now to FIG. 2, the UTOPIA interface 11 of the present invention is designed to connect an ATM-PHY layer device 14b with an ATM-ATM layer device 12b. As noted with reference to FIG. 1, it should be understood that while this disclosure discusses a single ATM layer device 12b communicating to a single PHY layer device 14b, an application may typically involve a single ATM layer device 12b communicating with multiple PHY layer devices 14b. Further, multiple ATM layer devices 12b may communicate with multiple PHY layer devices 14b. Finally, a management entity, 16b of the management and control layer 16a (FIG. 1), is connected to the PHY layer device 14b through a serial management interface 25 of the UTOPIA interface 11. By convention, the interface where data flows from the ATM layer 12a (FIG. 1) to the PHY layer 14a (FIG. 1) is referred to as the transmit interface 21. The interface where data flows from the PHY layer 14a (FIG. 1) to the ATM layer 12a (FIG. 1) is referred to as the receive interface 23. These portions of the UTOPIA interface 11 are further elaborated upon hereinafter with respect to FIG. 3.

Figure 3:
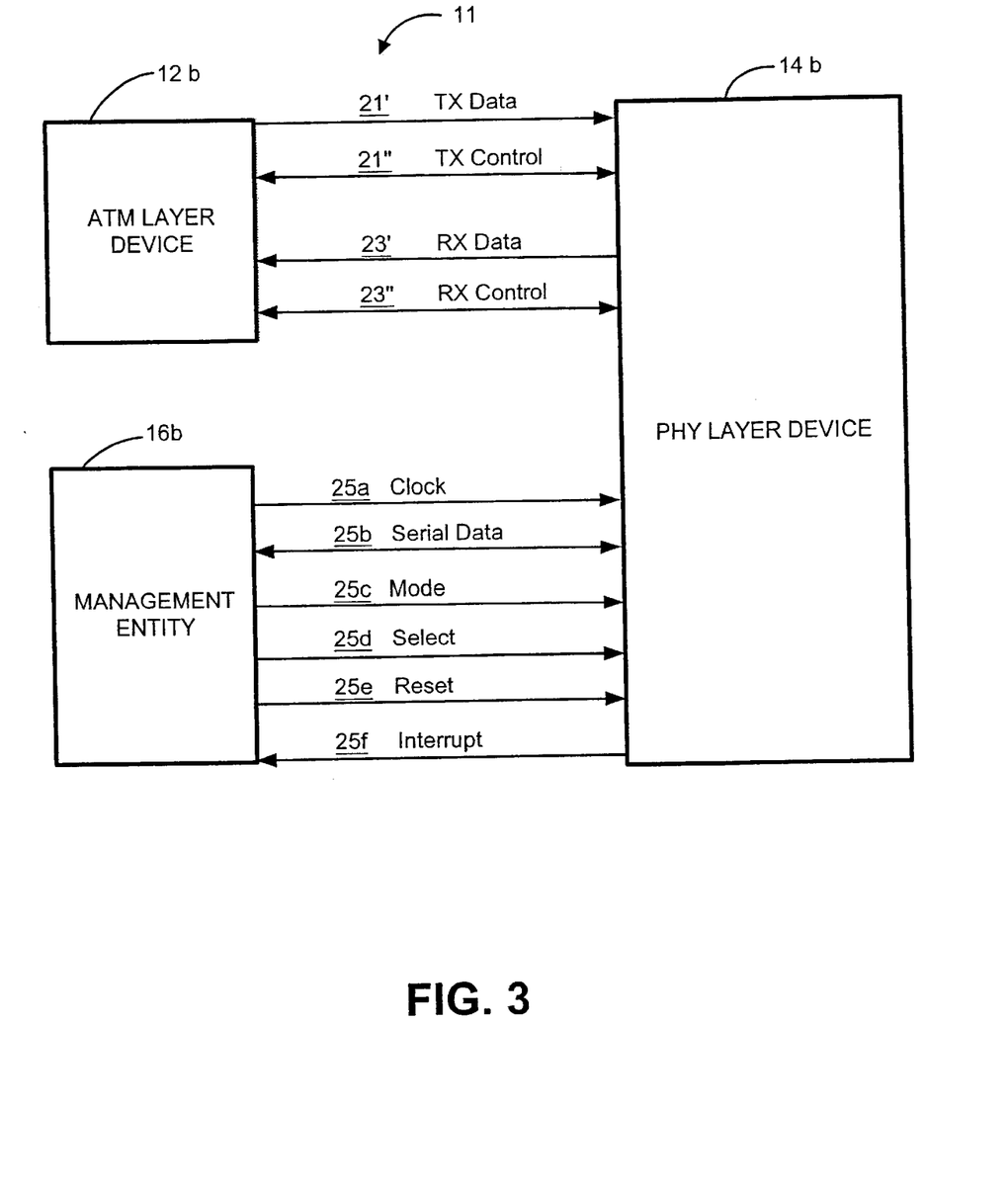
FIG. 3 is a diagram showing the serial management interface signals between the PHY layer device and the management entity of FIG. 2.

FIG. 3 illustrates a detailed view of the various portions of the UTOPIA interface 11. The transmit interface 21 (FIG. 2) is further comprises a transmit (TX) data signal 21', which flows from the ATM layer device 12b to the PHY layer device 14b, and a TX control signal 21" which flows bi-directionally between the ATM layer device 12b and the PHY layer device 14b. The bi-directional TX control signal 21" consists of a TX clock signal (TX CLK), TX start of cell signal (TX SOC) and TX cell transfer control signals, which communicate between the ATM layer device 12b to the PHY layer device 14b. Similarly, the receive interface 23 (FIG. 2) further comprises a receive (RX) data signal 23', which flows from the PHY layer device 14b to the ATM layer device 12b, and a RX control signal 23" which communicates bi-directionally between the ATM layer device 12b and the PHY layer device 12a. The RX control signal 23" consists of a RX clock signal (RX CLK), RX start of cell signal (RX SOC) and RX cell transfer control signals which communicate between the ATM layer device 12b and the PHY layer device 14b. The TX control 21" and the RX control 23" are important in that transmit and receive transfers are synchronized via their respective interface transfer clocks. The transfer of data at the octet level is via separate transmit and receive transfer synchronizing clocks. Generally, it is assumed that the PHY layer 14a (FIG. 1) accepts both transmit and receive transfer synchronizing clocks from the ATM layer 12a (FIG. 1). This allows the ATM layer 12a to remain constant across different PHY layers 14a (e.g., for use with different PHY daughterboards). Given that the PHY layer 14a accepts the transfer synchronizing clocks from the ATM layer 12a, the PHY layer 14a requires rate matching buffers, i.e., first-in-first-out (FIFOs). With the use of FIFOs, flow control signals are provided to allow both ATM layers 12a and PHY layers 14a to throttle the transfer rate.

With further reference to FIG. 3, the serial management interface 25, of the UTOPIA interface 11, is further illustrated. The management entity 16b uses the serial management interface 25 for the configuring, managing and monitoring of PHY layer device 14b. The bi-directional serial management interface 25 is comprised of multiple signals. A clock signal 25a, a mode signal 25b, a select signal 25d, and a reset signal 25e all communicate from the management entity 16b to the PHY layer device 14b for controlling and managing the PHY layer device 14b. An interrupt signal 25f is sent from the PHY layer device 14b to the management entity 16b enabling monitoring of the PHY layer device 14b by the management entity 16b. Serial data 25b is bi-directionally communicated between the management entity 16b and the PHY layer device 14b.

The clock signal 25a is free running and is used such that information is read in at the positive (rising) edge of the clock. Any information is output with the positive edge of the clock. The select signal 25d selects a PHY layer device 14b from multiple PHY layer devices 14b, which may be connected, and enables the transfer of address, control and data. If the select signal 25d is low, a PHY layer device 14b is selected. If the select signal 25d is high, a PHY layer device 14b is not selected and serial data 25b and the mode signal 25c are ignored. The PHY layer device 14b holds its output driver of serial data 25b in high impedance state (input mode). For writing into the PHY layer device 14b (control bits, address bits, write data) serial data 25b is only valid if the select signal 25d is low at the same clock edge. For a data byte transfer out of the PHY layer device 14b, serial data 25b is valid at the next rising clock edge when select signal 25d is low. When the reset signal 25e is low PHY layer device 14b is forced to reset. The output driver of serial data 25e is set into its high impedance state (input mode). Reset signal 25e is low at least for one clock cycle. Select signal 25d, clock signal 25a and reset signal 25e are driven high or low by the microprocessor at any time. Mode signal 25c and serial data 25b may float as long as no PHY layer device 14b is selected as indicated by select signal 25d. The interrupt signal 25f is level sensitive and is generated by the PHY layer device 14b and are low for at least one clock cycle.

Figure 4A:
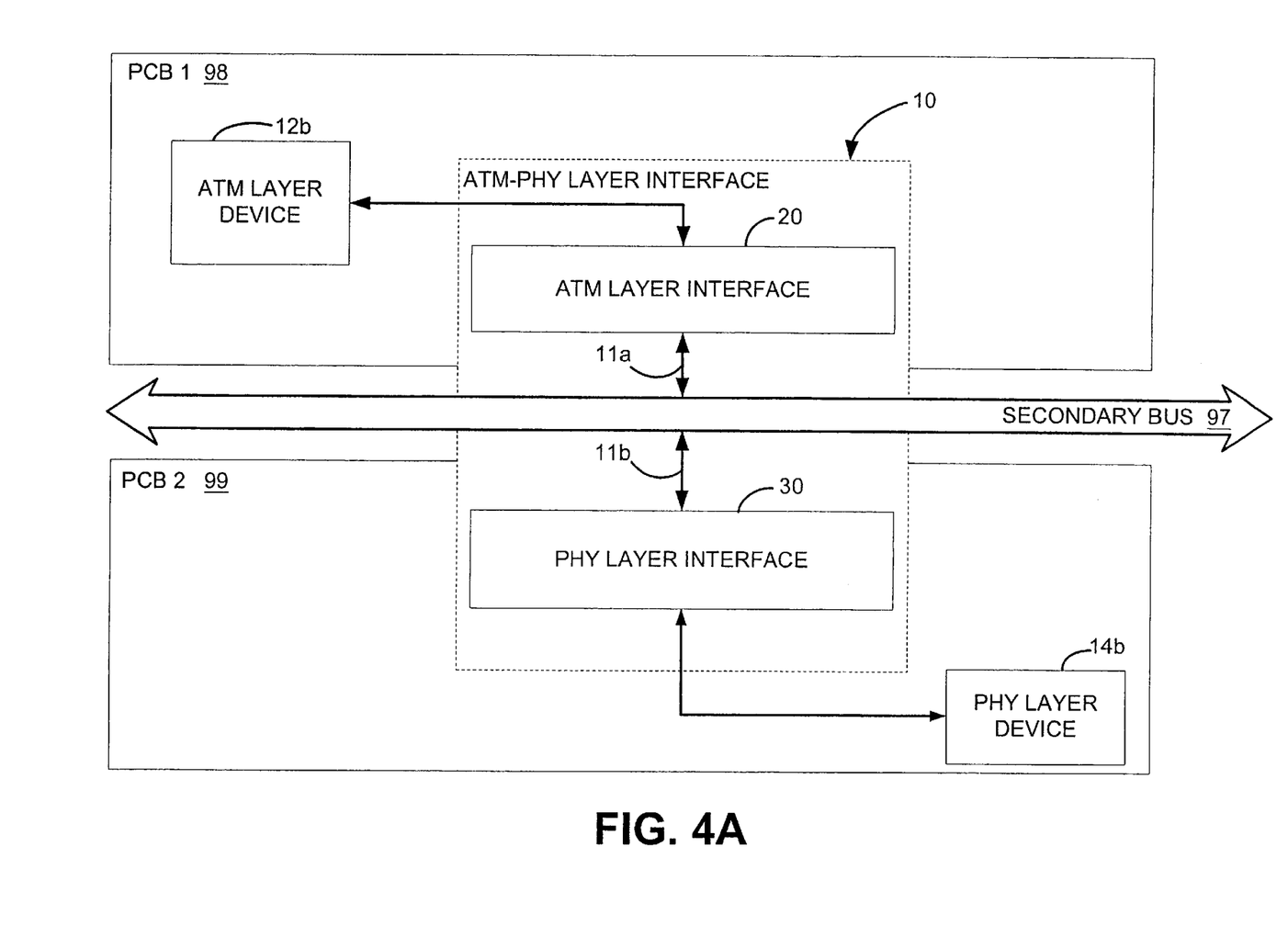
FIG. 4A is a block diagram of the present invention with respect to the PHY layer device and ATM layer device of FIG. 2 communicating across a serial bus.

FIG. 4A is a block diagram of the present invention 10 with respect to communication between the ATM layer device 12b on one PCB 98 and the PHY layer device 12b on a different PCB 99 across a serial bus 97. Prior to the present invention 10, ATM layer devices 12b and PHY layer devices 14b were implemented on the same PCB and were directly connected. Now, through use of the present invention, ATM layer devices and PHY layer devices can be implemented on different PCBs. The present invention 10 provide an ATM layer serial interface 20 and PHY layer serial interface 30 between an ATM layer device 12b and PCB 1 98 and the PHY layer device 14b and a different PCB 2 99. It should be understood that although the ATM layer serial interface 20 and the PHY layer serial interface 30 collectively make up the present invention 10, the ATM layer serial interface 20 exists on the ATM PCB 1 98 along with the ATM layer device 12b. Likewise, the PHY layer serial interface 30 exists on PHY PCB 2 99 along with the PHY layer device 14b. The present invention 10 facilitates communications between these two devices on two different PCBs across serial bus 97.

Figure 4B:
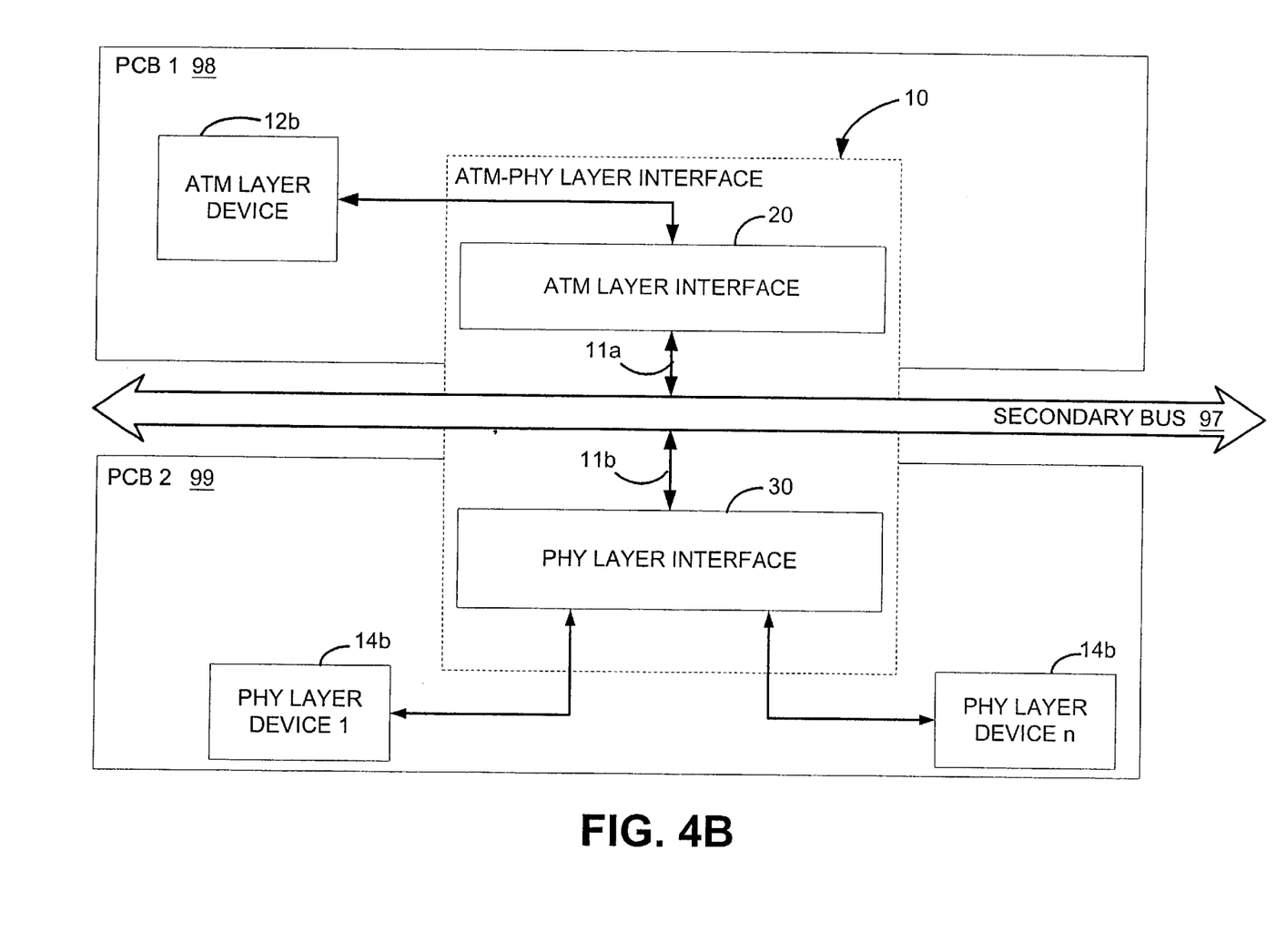
FIG. 4B is a block diagram of the present invention with respect to multiple PHY layer devices on the same printed circuit board and the ATM layer device of FIG. 2 communicating across a single serial bus.

With further reference to FIG. 4B, shown is yet another possible implementation of the ) present invention 10, where the present invention 10 facilitates communications between an ATM layer device 12b on PCB 1 98 and multiple PHY layer devices 14b on PCB 2 99. The present invention is capable of managing communications between a plurality of PHY layer devices 14b through a single PHY layer serial interface 30 on the same PCB 99 and an ATM layer device 12b on a different PCB 98.

Figure 4C:
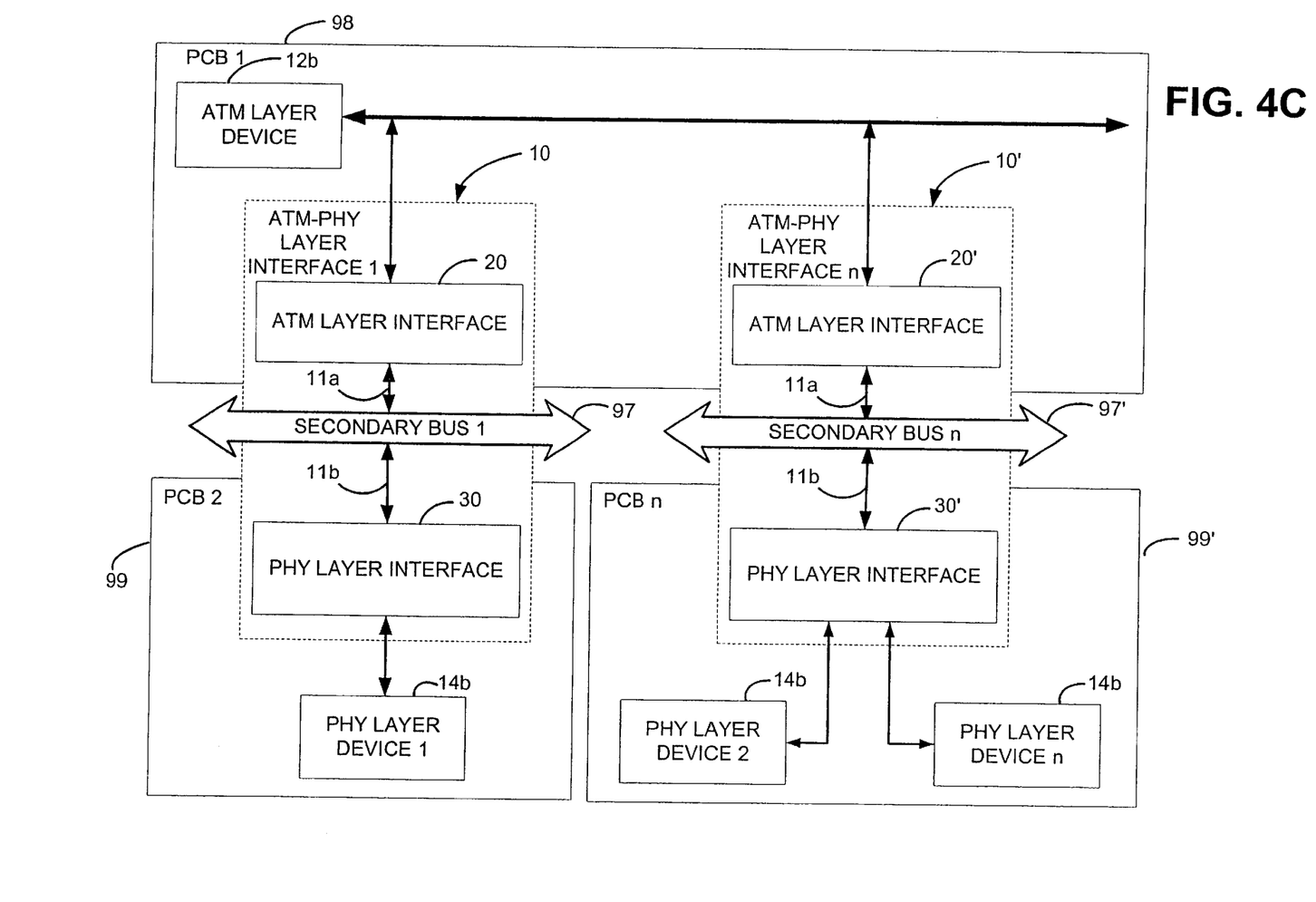
FIG. 4C is a block diagram of multiple instantiations of the present invention connecting the ATM layer device of FIG. 2 to multiple PHY layer devices across multiple serial buses.

Further, shown in FIG. 4C is still yet another possible implementation using the present invention 10. PCB 1 98 may contain multiple ATM layer serial interfaces 10 of multiple instantiations of the present invention 10, of which a single ATM layer device 12b may communicate with a plurality of PHY layer devices 14b on a plurality of PCBs across a plurality of serial buses 97. Additionally, you can have two buses connected to the same PCB. There is no limitation of one PHY layer device 14b or PHY layer serial interface 30 per one PCB. Multiple PHY layer serial interfaces can exist on the same PCB, connected to a PHY layer device (not shown). It should be understood that the ability of multiple instantiations of the present invention 10 makes possible a diverse number of implementations.

Figure 5:
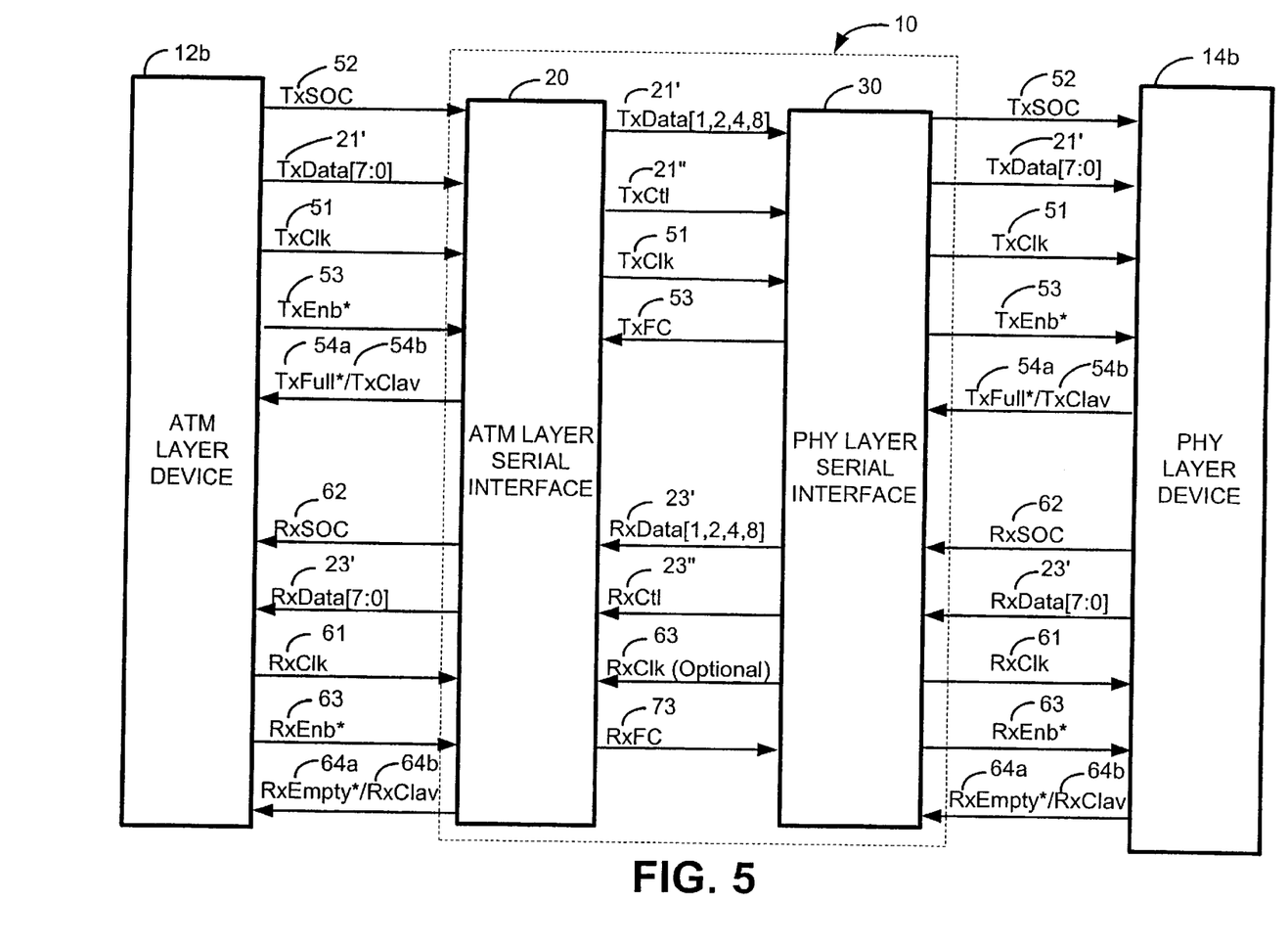
FIG. 5 is a system logical block diagram of the present invention as shown in FIG. 4 further showing the signals transmitted between the ATM layer device, the present invention and the PHY layer device.

With reference to FIG. 5, a system block diagram of the present invention 10 of FIG. 4 is shown further detailing the signals transmitted between the ATM layer device 12*b*, the present invention and the PHY layer device 14*b*. The TX DATA[7:0] 21' is a data signal. TX DATA 21' is byte-wide true data driven from an ATM layer device 12*b* to a PHY layer device 14*b*. TX DATA[7] 21' is the most significant bit (MSB) and is the highest order bit of a binary number not including the sign bit.

As described with respect to FIG. 3 above, TX control 21" (FIG. 3) comprises TX CLK TX CLK 51, TX SOC, and TX cell transfer control signals. Similarly, the RX control 23" (FIG. 3) comprises RX CLK 61, RX SOC 62, and RX cell transfer control signals. It should be understood that these signals are communicated between the ATM layer device 12*b* and the PHY layer device 14*b* via the present invention 10, across the serial bus 97. TX SOC 52 is an active high signal asserted by the ATM layer device 12*b* when TX DATA 21' contains the first valid byte of the cell. Another TX control signal, TX ENB* 53, is the enable signal. This is an active low signal asserted by the ATM layer device 12*b* during cycles when TX DATA 21' contains valid cell data. Yet another control signal, TX FULL*/TX CLAV 54*a* and 54*b*, is the full/cell available signal. For octet-level flow control, TX FULL* 54*a* is an active low signal from the PHY layer device 14*b* to the ATM layer device 12*b*, asserted by the PHY layer device 14*b* to indicate a maximum of four more transmit data writes will be accepted. For cell-level flow control, TX CLAV 54*b* is an active high signal from PHY layer device 14*b* to ATM layer device 12*b* asserted by the PHY layer device 14*b* to indicate it can accept the transfer of a complete cell. TX CLK 51 is the data transfers/synchronization clock provided by the ATM layer device 12*b* to the PHY layer device 14*b* for synchronizing transfers on the TX DATA signal 21'.

The RX DATA [7:0] 23' is also a data signal. This data signal is byte-wide data driven from PHY layer device 14*b* to ATM layer device 12*b*. RX DATA [7] 23', as in TX DATA[7] 23', is the MSB. RX SOC 62 is an active high signal asserted by the PHY layer device 14*b* when RX DATA 23' contains the first valid byte of the cell. Another control signal, the RX ENB* 63, is the enable signal. This is an active low signal asserted by the ATM layer device 12*b* to indicate that RX DATA 23' and RX SOC 62 will be sampled at the end of the next cycle. To support multiple PHY layer 14*b* configurations, RX ENB* 63 should be used to tri-state RX DATA 23' and RX SOC 62 PHY layer device 14*b* outputs. RX DATA 23' and RX SOC 62 should be enabled only in cycles following those with RX ENB* 63 asserted. For octet-level flow control, another RX control signal, RX EMPTY* 64*a* is used and is an active low signal from the PHY layer device 14*b* to indicate that in the current cycle, there is no valid data for delivery to the ATM layer device 12*b*. For cell-level flow control, RX CLAV 64*b* is an active high signal from PHY layer device 14*b* to indicate that it has a completed cell available for transfer to the ATM layer device 12*b*. In both cases, this signal indicates cycles when there is valid information on RX DATA 23' and RX SOC 62. RX CLK 61 is an optional clock signal. This data transfer/synchronization clock is provided by the ATM layer device 12*b* to the PHY layer device 14*b* for synchronizing transfers on the RX DATA signal 23'.

Now turning to the signals of the present invention which exist between the ATM layer serial interface 20 and the PHY layer serial interface 30 of the present invention 10, shown are the signals which are actually communicated across the serial bus 97 (FIG. 4). Bits 1, 2, 4 and 8 of the TX DATA signal 21' from the ATM layer device 12*b* are communicated by the ATM layer serial interface 20 of the present invention 10 across the serial bus 97 to the PHY layer serial interface 30 of the present invention 10. The TX CTL 21" signal indicates then the start of cell or the end of cell is encountered across the interface 10 as indicated by the TX SOC 52. This signal also indicates whether data is valid or suspended across the serial bus; hence, all data received during the suspend state is invalid. The TX CLK signal 51 is also communicated from the ATM layer serial interface 20 to the PHY layer serial interface 30. A transmit flow control signal (TX FC) 53 is communicated from the PHY layer serial interface 30 back to the ATM layer serial interface 20. Bits 1, 2, 4 and 8 of the RX DATA signal 23' from the PHY layer device 14*b* are communicated by the PHY layer serial interface 30 of the present invention 10 across the serial bus 97 to the ATM layer serial interface 20 of the present invention 10. The RX CTL 23" signal indicates when the start of cell or the end of cell is encountered across the interface 10 as indicated by the RX SOC 62. This signal, as with its transmit counterpart TX CTL 21", also indicates whether data is valid or suspended across the serial bus; hence, all data received during the suspend state is invalid. The RX CLK signal 63 is optional and is communicated from the PHY layer serial interface 30 to the ATM layer serial interface 20. A receive flow control signal (RX FC) 73 is communicated from the ATM layer serial interface 30 back to the PHY layer serial interface 20.

It should be understood that the TX CTL 21" and the RX CTL 23" are carried in their respective data signals TX DATA 21' and RX DATA 23' as an in-band signal, or can be transmitted as its own signal in out-of-band signaling. Thus, TX CTL 21" and RX CTL 23" would not be physically present in FIG. 5 for in-band signaling and would be physically present in FIG. 5 for out-of-band signaling. The figure is logical only and is intended to show that these control signals are transmitted across the serial bus by the present invention 10.

The two methods of flow control are octet-level and cell-level. The same flow control signal is used, but has a slight semantic difference, depending upon the flow control method. The transfer of data is synchronized at the cell level via a start-of-cell signal, TX SOC 52. This signal is asserted when the data transfer path contains the first byte of a cell. The use of octet-level or cell-level status signals for flow control is possible.

With further reference to FIG. 5, it should be understood that either the ATM layer device 12*b* or the PHY layer device 14*b* may be the transmitter or the receiver, according to the direction of information flow. According to the preferred embodiment, 53 octets are serialized over the bus by the transmitting ATM layer device 12*b* through the present invention 10 via TX DATA[7:0] 21' and received at the receiving PHY layer device 14*b*. During in-band signaling, an end-of-cell is detected by counting bytes and detecting an end-of-cell delimiter. The end-of-cell delimiter can either be a fixed pattern or can change state depending on how robust a cell synchronization scheme is desired. Following the end-of-cell delimiter, a start-of-cell indicator is sent via TX SOC 52 indicating the next bit is the first bit of the next cell. In-band, this start-of-cell is transmitted across the present invention in the data signal TX DATA. Out-of-band, this signal is transmitted across the interface by TX CTL 21". If the ATM layer device 12*b* does not have a cell to send, then it can insert idle identifiers for one or more bus periods until it does have a cell to send. Cell synchronization is performed in-band eliminating the need for extra control signals across the interface 10. In one embodiment, the end-of-cell delimiter is a 1 bit pseudo-random sequence, which changes state at the end of every cell. The idle/start-of-cell indicator is a single bit 1/0 indicator. One or more 1's indicates an idle condition, a 0 indicates a start-of-cell. Synchronization is initially obtained through training by sending all 1's for 1 cell duration, giving the receiver the ability to synchronize and look for the start-of-cell delimiter. If the receiver ever determines that it is out-of-sync, it can request the remote transmitter initiate a retrain by piggy backing a retrain request through its local transmitter's bit stream. The retrain request may be encoded in either the idle or start-of-cell identifier.

According to another preferred embodiment, cell level flow control enables a receiver to signal to its remote transmitter to stop sending cells, until the receiver is ready to accept them again. This occurs when the receiver begins experiencing congestion and it wants the transmitter to slow down. The receiver needs to pass the flow control signal via the TX FC 53 or the RX FC 73 to the remote transmitter. This flow control signal may be sent as distinct signals or may optimally be passed by piggy backing the cell level flow control indicator in its local transmitter's bit stream. The flow control indicator may be sent at the end of every cell. The flow control indicator may be as simple as a single bit or may be a n-bit identifier which indicates how many octets the remote transmitter should wait before sending the next cell. If a single bit is used, the transmitter waits until the next time the cell level flow control bit is received via the TX FC 53 or the RX FC 73 in the receive data stream. The n-bit identifier provides a finer granularity for cell level flow control. This value can be set by the receiver based on the amount of anticipated available buffer space it will have by the time it is able to send the cell level flow control indicator.

In yet another embodiment, octet level flow control introduces the added complexity that either the PHY layer interface 30 or ATM layer interface 20 be able to send a control signal indication to the other end at any time. It performs this operation by briefly interrupting the data sent by its local transmitter, to send the control signal to the other end. In order to suspend data in the middle of a cell transfer to insert a flow control indicator, a suspend delimiter is defined in the data stream. The suspend delimiter is a unique bit pattern in the serial stream. Any cell data sent over the bus 97 (FIG. 4) which looks like the suspend delimiter is encoded into another bit pattern to prevent data from being mistaken for the suspend delimiter. When the receiver sees the suspend delimiter, it removes the suspend delimiter from the data stream, and performs byte level flow control over the UTOPIA interface 10. Following the suspend delimiter, one or more control bits are sent over the bus 97 (FIG. 4) which are received by the receiver. The flow control bits are passed by the receiver over to its local transmitter side for processing. Following the control bits, either another suspend delimiter or additional cell data can be sent. The suspend delimiter can also be used by the transmitter to perform octet level flow control of the receiver across the bus 97 (FIG. 4). Through the use of the suspend delimiter and flow control bits, the transmitter can flow control its receiver, and the receiver can also signal to the remote transmitter.

Cell synchronization for asynchronous cell transmission with flow control is achieved similarly to the case without flow control. End-of-cell detection is performed and synchronization is verified. If synchronization is determined to be lost, a retrain is requested.

Finally, it should be understood that the interface of the present invention can be implemented in hardware, software, firmware, or a combination thereof. In one embodiment, the interface is implemented in software or firmware that is stored in a memory and that is executed by a suitable instruction execution system. The interface in the form of a program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

In concluding the detailed description, it should be noted that it will be obvious to those skilled in the art that many variations and modifications can be made to the preferred embodiment without substantially departing from the principles of the present invention. All such variations are intended to be included herein within the scope of the present invention, as set forth in the following claims.

Therefore, having thus described the invention, at least the following is claimed:

1. A method of asynchronous cell transmission without flow control, from an Asynchronous Transfer Mode (ATM) layer transceiver to a Physical (PHY) layer transceiver across a secondary bus, comprising the steps of:

transmitting cell information and transmission control information over said secondary bus from a transmitting transceiver to a receiving transceiver;
        wherein said transmitting step further comprises the steps of:

transmitting a start-of-cell indicator by said transmitting transceiver;
receiving a start-of-cell indicator by said receiving transceiver;
transmitting an end-of-cell indicator by said transmitting transceiver;
receiving an end-of-cell indicator by said receiving transceiver;
determining whether a cell is currently being transmitted;
transmitting an idle indicator by said transmitting transceiver; and
receiving an idle indicator by said receiving transceiver;
wherein said transmitting steps are regulated by in-band signaling; and
wherein all of said indicators are fixed n-bit patterns,
detecting the cell transmission control signals; and
communicating said cell information responsive to said cell transmission control information from said detecting step.

2. The method of claim 1, wherein said end-of-cell indicator changes state depending on a cell synchronization scheme.

3. A method of asynchronous cell transmission using cell-level flow control, from an Asynchronous Transfer Mode (ATM) layer transceiver to a Physical (PHY) layer transceiver across a secondary bus, comprising the steps of:
transmitting cell information and transmission control information over said secondary bus from a transmitting transceiver to a receiving transceiver;
wherein said transmitting step further comprises the steps of:
transmitting a start-of-cell indicator by said transmitting transceiver;
receiving a start-of-cell indicator by said receiving transceiver;
transmitting an end-of-cell indicator by said transmitting transceiver;
receiving an end-of-cell indicator by said receiving transceiver;
determining whether a cell is currently being transmitted;
transmitting an idle indicator by said transmitting transceiver; and
receiving an idle indicator by said receiving transceiver;
wherein said transmitting steps are transmitted using in-band signaling,
wherein all of said indicators are fixed n-bit patterns,
detecting the cell transmission control signals; and
communicating said cell information responsive to said cell transmission control information from said detecting step.

4. The method of claim 3, wherein said transmitting transceiver transmits a cell level flow control indicator when its receiving portion is experiencing congestion.

5. The method of claim 4, wherein said cell level flow control indicator is a single bit.

6. The method of claim 4, wherein said cell level control flow indicator is an n-bit identifier.

7. A method of asynchronous cell transmission without flow control, from an ATM layer transceiver to a PHY layer transceiver across a secondary bus, comprising the steps of:
transmitting cell information and transmission control information over said secondary bus from a transmitting transceiver to a receiving transceiver, said receiving transceiver requesting said transmitting transceiver to send a retrain sequence when said receiving transceiver determines said receiving transceiver is out-of-sync;
wherein said transmitting step further comprises the steps of:
transmitting a start-of-cell indicator by said transmitting transceiver;
receiving a start-of-cell indicator by said receiving transceiver;
transmitting an end-of-cell indicator by said transmitting transceiver;
receiving an end-of-cell indicator by said receiving transceiver;
determining whether a cell is currently being transmitted;
transmitting an idle indicator by said transmitting transceiver; and
receiving an idle indicator by said receiving transceiver;
wherein said transmitting steps are regulated by in-band signaling; and
wherein said indicators change state depending on a cell synchronization scheme,
detecting the cell transmission control signals; and
communicating said cell information responsive to said cell transmission control information from said detecting step.

8. The method of claim 7, wherein said retrain request is encoded in said idle indicator.

9. The method of claim 7, wherein said retrain request is encoded in said start-of-cell identifier.

10. The method of claim 7, wherein said synchronization is initially obtained through training, wherein the same bit is sent for one cell duration.

11. A method of asynchronous cell transmission having cell level flow control, from an ATM layer transceiver to a PHY layer transceiver across a secondary bus, comprising the steps of:
transmitting cell information and transmission control information over said secondary bus from a transmitting transceiver to a receiving transceiver;
wherein said transmitting step further comprises the steps of:
transmitting a start-of-cell indicator by said transmitting transceiver;
receiving a start-of-cell indicator by said receiving transceiver;
transmitting an end-of-cell indicator by said transmitting transceiver;
receiving an end-of-cell indicator by said receiving transceiver;
determining whether a cell is currently being transmitted;
transmitting an idle indicator by said transmitting transceiver; and
receiving an idle indicator by said receiving transceiver;
wherein said transmitting steps are regulated by in-band signaling;
wherein said indicators are fixed n-bit patterns;
wherein said transmitting transceiver transmits a cell level flow control indicator when its receiving portion is experiencing congestion;
wherein said cell level control flow indicator is an n-bit identifier; and wherein said n-bit identifier is set by the receiving transceiver based on the amount of anticipated available buffer space said receiving transceiver will have by the time said receiving transceiver is able to send said cell level flow control indicator, detecting the cell transmission control signals; and communicating said cell information responsive to said cell transmission control information from said detecting step.

12. A method of asynchronous cell transmission having octet level flow control, from an ATM layer transceiver to a PHY layer transceiver across a secondary bus, comprising the steps of:

transmitting cell information and transmission control information over said secondary bus from a transmitting transceiver to a receiving transceiver;

wherein said transmitting step further comprises the steps of:

transmitting a start-of-cell indicator by said transmitting transceiver;

receiving a start-of-cell indicator by said receiving transceiver;

transmitting an end-of-cell indicator by said transmitting transceiver;

receiving an end-of-cell indicator by said receiving transceiver;

determining whether a cell is currently being transmitted;

transmitting an idle indicator by said transmitting transceiver;

receiving an idle indicator by said receiving transceiver;

transmitting a suspend indicator by said transmitting transceiver; and receiving a suspend indicator by said receiving transceiver;

detecting the cell transmission control signals; and communicating said cell information responsive to said cell transmission control information from said detecting step.

13. The method of claim 12, wherein said transmitting steps are transmitted using out-of-band signaling.

14. The method of claim 12, wherein said transmitting steps are regulated by in-band signaling.

15. The method of claim 14, wherein said indicators are fixed n-bit patterns.

16. The method of claim 15, wherein said suspend indicator is a unique bit pattern.

17. The method of claim 16, wherein other bit patterns which resemble said suspend indicator are encoded into another bit pattern to prevent data from being mistaken for said suspend indicator.

18. The method of claim 12, wherein upon receiving said suspend indicator, a flow control indicator is inserted by said transmitting transceiver within said cell currently being transmitted.

19. The method of claim 18, wherein upon receiving transceiver receiving said suspend indicator, said receiving transceiver removes said suspend indicator from the data stream and performs byte level flow control over the UTOPIA interface.

* * * * *